(12) United States Patent
Zhang (10) Patent No.: US 10,958,459 B2
(45) Date of Patent: Mar. 23, 2021

(54) METHOD AND APPARATUS FOR PROCESSING GROUP CHAT MESSAGE

(71) Applicant: TENCENT TECHNOLOGY (SHENZHEN) COMPANY LIMITED, Shenzhen (CN)

(72) Inventor: Lei Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 434 days.

(21) Appl. No.: 15/429,484

(22) Filed: Feb. 10, 2017

(65) Prior Publication Data

US 2017/0155521 A1 Jun. 1, 2017

Related U.S. Application Data

(63) Continuation of application No. PCT/CN2016/074855, filed on Feb. 29, 2016.

(30) Foreign Application Priority Data

Mar. 23, 2015 (CN) .......................... 201510129265.6

(51) Int. Cl.
*H04L 12/18* (2006.01)
*G06F 16/248* (2019.01)
(Continued)

(52) U.S. Cl.
CPC ........ *H04L 12/1822* (2013.01); *G06F 16/248* (2019.01); *G06F 16/9535* (2019.01);
(Continued)

(58) Field of Classification Search
CPC . H04L 12/1822; H04L 12/1831; H04L 51/16; H04L 51/046; H04L 12/1818;
(Continued)

(56) References Cited

U.S. PATENT DOCUMENTS

2003/0028597 A1* 2/2003 Salmi .................. G06F 21/6245
  709/204
2004/0049539 A1* 3/2004 Reynolds ................ G06F 3/165
  709/203
(Continued)

FOREIGN PATENT DOCUMENTS

CN 101039284 A 9/2007
CN 101056188 * 10/2007
(Continued)

OTHER PUBLICATIONS

The World Intellectual Property Organization (WIPO) International Search Report for PCT/CN2016/074855 dated Apr. 28, 2016 5 Pages.
(Continued)

*Primary Examiner* — Chris Parry
*Assistant Examiner* — Weiwei Y Stiltner
(74) *Attorney, Agent, or Firm* — Anova Law Group, PLLC (57) ABSTRACT

The present disclosure discloses a method and an apparatus for processing a group chat message. The method includes: determining that a specified user is joined into a group; if at least one chat message exists in the group within a preset time period before a current time, obtaining the at least one chat message within the preset time period; selecting a chat message from the at least one chat message within the preset time period; and sending a message identifier of the selected chat message to a target server, so that the target server sends the selected chat message in the group according to the message identifier of the selected chat message. According to the present disclosure, by means of a simple selection operation, a previous chat message can be presented to a specified user that newly joins a group, thereby greatly improving processing efficiency.

12 Claims, 6 Drawing Sheets

(51) Int. Cl.
　　　*G06F 16/9535*　　(2019.01)
　　　*H04L 12/58*　　　(2006.01)
　　　*G06Q 10/10*　　　(2012.01)
　　　*G06Q 50/00*　　　(2012.01)
　　　*G06F 3/0482*　　 (2013.01)

(52) U.S. Cl.
　　　CPC ........... *G06Q 10/10* (2013.01); *G06Q 10/107* (2013.01); *G06Q 50/01* (2013.01); *H04L 12/1818* (2013.01); *H04L 12/1831* (2013.01); *H04L 51/046* (2013.01); *H04L 51/16* (2013.01); *G06F 3/0482* (2013.01)

(58) Field of Classification Search
　　　CPC ...... G06Q 50/01; G06Q 10/107; G06Q 10/10; G06F 16/9535; G06F 16/248; G06F 3/0482
　　　USPC .......................................................... 709/206
　　　See application file for complete search history.

(56) References Cited

U.S. PATENT DOCUMENTS

| | | | | |
|---|---|---|---|---|
| 2009/0061825 | A1* | 3/2009 | Neelakantan | H04L 29/12292 455/412.1 |
| 2012/0231770 | A1* | 9/2012 | Clarke | H04W 4/12 455/414.1 |
| 2013/0007138 | A1* | 1/2013 | Lin | H04L 12/6418 709/206 |
| 2014/0245176 | A1* | 8/2014 | Murali | H04L 51/22 715/752 |
| 2015/0169208 | A1* | 6/2015 | Cho | H04L 12/1827 715/752 |
| 2015/0188862 | A1* | 7/2015 | Ghafourifar | H04L 51/066 709/206 |
| 2015/0215245 | A1* | 7/2015 | Carlson | G06F 3/04817 715/752 |
| 2015/0242086 | A1* | 8/2015 | Mindlin | G06F 3/0481 715/769 |
| 2015/0365361 | A1* | 12/2015 | Tomlinson | H04L 51/04 709/206 |
| 2016/0154556 | A1* | 6/2016 | Cheung | H04W 4/08 715/752 |

FOREIGN PATENT DOCUMENTS

| | | |
|---|---|---|
| CN | 101056188 A | 10/2007 |
| CN | 201146535 Y | 11/2008 |
| CN | 201210691 Y | 3/2009 |
| WO | 2013042056 A1 | 3/2013 |

OTHER PUBLICATIONS

The State Intellectual Property Office of the People's Republic of China (SIPO) Office Action 1 for 201510129265.6 dated Feb. 1, 2019 9 Pages (including translation).

* cited by examiner

METHOD AND APPARATUS FOR PROCESSING GROUP CHAT MESSAGE

CROSS-REFERENCES TO RELATED APPLICATION

This application is a continuation application of PCT Patent Application No. PCT/CN2016/074855, filed on Feb. 29, 2016, which claims priority to Chinese Patent Application No. 201510129265.6, entitled "METHOD AND APPARATUS FOR PROCESSING GROUP CHAT MESSAGE" filed on Mar. 23, 2015, the entire contents of both of which are incorporated herein by reference.

FIELD OF THE TECHNOLOGY

Embodiments of the present invention relate to the field of terminal technologies, and in particular, to a method and an apparatus for processing a group chat message.

BACKGROUND OF THE DISCLOSURE

With the development of communications technologies, people become increasingly dependent on instant messaging applications. In work and life, users can have a multi-person chat in the form of a group chat.

In a scenario of a group chat, a user in a group may invite other users to join the current group due to some reasons. Previous chat messages in the group are invisible to these users who newly join the group. Therefore, to enable the users who newly join the group to participate in the chat, an original user in the group may need to perform a series of operations such as screenshot capturing or copy and paste on chat message history, so as to present previous chats to the users who newly join the group. Efficiency of this processing process is quite low.

The disclosed method and system are directed to solve one or more problems set forth above and other problems.

BRIEF SUMMARY OF THE DISCLOSURE

To resolve the problem in the existing technology, embodiments of the present invention provide a method and an apparatus for processing a group chat message. The technical solutions are as follows.

According to an aspect, an embodiment of the present invention provides a method for processing a group chat message, where the method includes: determining that a user is joined into a group; if at least one chat message exists in the group within a preset time period before a current time, obtaining the at least one chat message within the preset time period; selecting a chat message from the at least one chat message within the preset time period; and sending a message identifier of the selected chat message to a target server. Further, the target server sends the selected chat message to the user according to the message identifier of the selected chat message.

According to another aspect, an embodiment of the present invention provides an apparatus for processing a group chat message, where the apparatus includes: at least one processor configured to determine that a user is joined into a group; if at least one chat message exists in the group within a preset time period before a current time, obtain the at least one chat message within the preset time period; select a chat message from the at least one chat message within the preset time period; and send a message identifier of selected chat message to a target server. Further, the target server sends the selected chat message to the user according to the message identifier of the selected chat message.

According to another aspect, an embodiment of the present invention provides non-transitory computer-readable medium containing one or more programs for, when being executed by one or more processors, performing operations for processing a group chat message. The operations may include determining that a user is joined into a group; if at least one chat message exists in the group within a preset time period before a current time, obtaining the at least one chat message within the preset time period; selecting a chat message from the at least one chat message within the preset time period; and sending a message identifier of the selected chat message to a target server. Further, the target server sends the selected chat message to the user according to the message identifier of the selected chat message.

Other aspects of the present disclosure can be understood by those skilled in the art in light of the description, the claims, and the drawings of the present disclosure.

Beneficial effects brought by the technical solutions provided in the embodiments of the present invention are: when a specified user joins a group, it is determined whether a chat messages exists in the group recently, so that a specified chat message is sent to the specified user according to the chat message. A very simple manner of sending a specified chat message is provided to a user, so that the user can present a previous chat message to a specified user that newly joins a group, thereby greatly improving processing efficiency.

BRIEF DESCRIPTION OF THE DRAWINGS

To describe the technical solutions of the embodiments of the present invention or the existing technology more clearly, the following briefly introduces the accompanying drawings required for describing the embodiments or the existing technology. Apparently, the accompanying drawings in the following description show only some embodiments of the present invention, and a person of ordinary skill in the art may still derive other drawings from these accompanying drawings without creative efforts.

DESCRIPTION OF EMBODIMENTS

To make the objectives, technical solutions, and advantages of the present disclosure clearer, implementation manners of the present invention are described in further detail below with reference to the accompanying drawings.

A group is a loose structure formed of users in a social application. Users in a group may be friends or may be strangers. Users in a same group may exchange information in a same chat (e.g., in a chat window) by using a chat message in the form of a text message, symbol information, a picture, voice data, and video data, among others.

A social application refers to an instant messaging application or some other applications such as a microblogging application that have a function of an instant messaging application.

Figure 1:
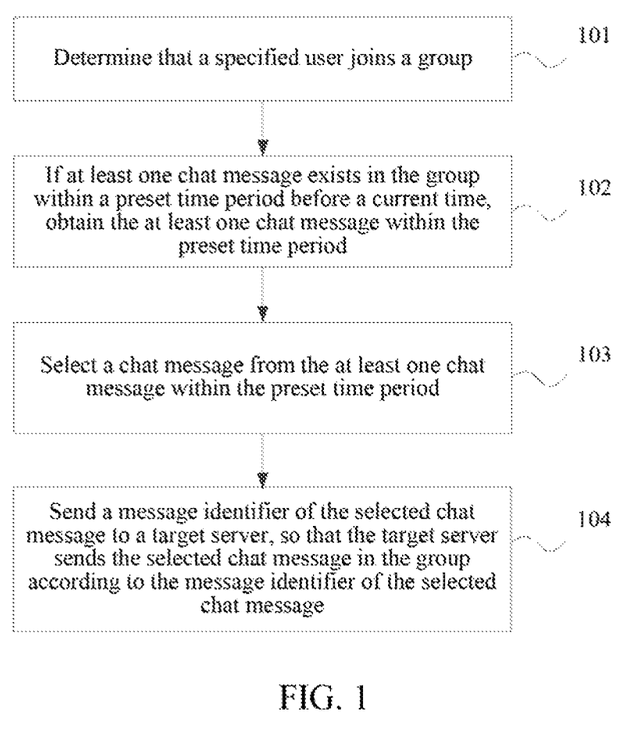
FIG. 1 is a flowchart of a method for processing a group chat message according to an embodiment of the present invention.

FIG. 1 is a flowchart of a method for processing a group chat message according to an embodiment of the present invention. The method can be applied to a terminal. Optionally, the terminal is a terminal on which a social application is running, a group exists in the social application, and a current user is further logged in to the social application by using a user account. Referring to FIG. 1, the method for processing a group chat message includes the following steps. The method may be implemented, for example, on a user terminal installed with the social application.

101: Determining that a specified user is joined into a group.

The specified user may be a friend or a stranger of a current terminal user, and is not limited in this embodiment of the present invention. Optionally, the specified user is a specified user that is invited. That is, the specified user is a user that is invited by any user in the group that has a permission to send an invitation. For example, the user that has a permission to send an invitation is a current user or an administrator. Alternatively, the specified user may find the group (e.g., based on a group identification number, a group nickname, group category or profile information, etc.), and send a request to join the group.

In addition, the group may be a temporary group such as a discussion group, or may be a relatively stable group such as a user group.

102: If at least one chat message exists in the group (e.g., group chat dialog) within a preset time period before a current time, obtaining the at least one chat message within the preset time period.

The preset time period may be set by a user of a terminal, or may be set by default by a target server, and is not limited in this embodiment of the present invention.

To prevent an excessively large quantity of messages from interfering with the user, the preset time period may be set to a relatively suitable time period, which is, for example, from 30 minutes to one hour. For example, if the current time is 9:00 PM, the preset time period may be from 8:30 PM to 9:00 PM, or from 8:15 PM to 8:50 PM. Certainly, the preset time period may also be set according to an actual scenario, and specific duration of the time period is not limited in this embodiment of the present invention. Alternatively, the preset time period may be set based on a preset number of messages, e.g., the latest 50 messages.

103: Selecting a chat message from the at least one chat message within the preset time period.

Not all chat messages within the preset time period need to be sent to the specified user. A current user may determine all the chat messages within the preset time period as specified chat messages, or may determine some of the chat messages within the preset time period as specified chat messages.

This step may be performed by a terminal, or may be performed by means of interaction between a user and a terminal, and is not limited in this embodiment of the present invention.

104: Sending a message identifier of the selected chat message to a target server, so that the target server sends the selected chat message to the specified user according to the message identifier of the selected chat message.

Each chat message corresponds to one message identifier for uniquely identifying the chat message. When the terminal sends the message identifier of the specified chat message to the target server, the target server may send the specified chat message to the specified user in an instant messaging manner according to the specified user that is previously invited and the message identifier.

According to the method provided in this embodiment of the present invention, when a specified user joins a group, it is determined whether a chat messages exists in the group recently, so that a specified chat message is sent to the specified user according to the chat message. A very simple manner of sending a specified chat message is provided to a user, so that the user can present a previous chat message to a specified user that newly joins a group, thereby greatly improving processing efficiency.

Optionally, the determining that a specified user joins a group includes: sending, to the target server, an invitation message inviting the specified user to join the group, so that the target server adds the specified user to the group and returns a joining success message, and when the joining success message from the target server is received, determining that the specified user joins the group; or sending, to the target server, an invitation message inviting the specified user to join the group, so that the target server forwards the invitation message to the specified user, and when the specified user accepts the invitation and joins the group, the target server returns a joining success message, and when the joining success message from the target server is received, determining that the specified user joins the group.

Optionally, the selecting a chat message from the at least one chat message within the preset time period includes: displaying a message selection pop-up window, where the message selection pop-up window includes the chat message within the preset time period; and obtaining the specified chat message according to a selection operation detected on the message selection pop-up window.

The message selection pop-up window may be displayed on a top layer of a current group chat interface, or may be displayed in any area, and a display position of the message selection pop-up window may also be changed according to an operation of the user, which are not limited in this embodiment of the present invention.

A current terminal user may perform selection on multiple chat messages displayed in the message selection pop-up window, and when a selection operation on any chat message by the user is detected, the chat message corresponding to the selection operation is obtained and used as a specified chat message. Certainly, the user may also close the message selection pop-up window. In this case, it may be considered that the user does not intend to resend a previous chat message to a user that newly joins a group. A specific process of closing the message selection pop-up window may include closing the message selection pop-up window when the terminal detects a click operation of the user on a close option in the message selection pop-up window.

Optionally, before the displaying a message selection pop-up window, the method further includes: sending a search request to the target server, where the search request carries the current time, so that the target server searches for a chat message history of the group according to the current time (and/or according to the preset time period), and returns a search result, and if the search result includes a chat message (i.e., not empty), performing the step of displaying a message selection pop-up window; or searching for a locally-cached chat message history of the group according to the current time (and/or according to the preset time period), to obtain a search result, and if the search result includes a chat message, performing the step of displaying a message selection pop-up window. The locally-cached chat message history may be stored on the user terminal.

Optionally, the displaying a message selection pop-up window includes: if a chat message exists in the group within the preset time period before the current time, displaying the message selection pop-up window according to a sender, message content, and a sending time of the chat message within the preset time period, where each chat message in the message selection pop-up window corresponds to one message selection box. For example, the message selection pop-up window may allow the user to identify a filter condition e.g., messages from a same sender, messages including a certain keyword, etc.), display messages filtered based on the condition, and provide a "select all" option to select all messages satisfying the identified condition at once.

Optionally, the method further includes: when the message identifier of the specified chat message is sent to the target server, sending a group identifier (e.g., corresponding to the group) to the target server, so that the target server sends the specified chat message in the group (e.g., to the recently joined user).

All the foregoing optional technical solutions may be arbitrarily combined to form optional embodiments of the present invention, which are not enumerated herein.

Figure 2:
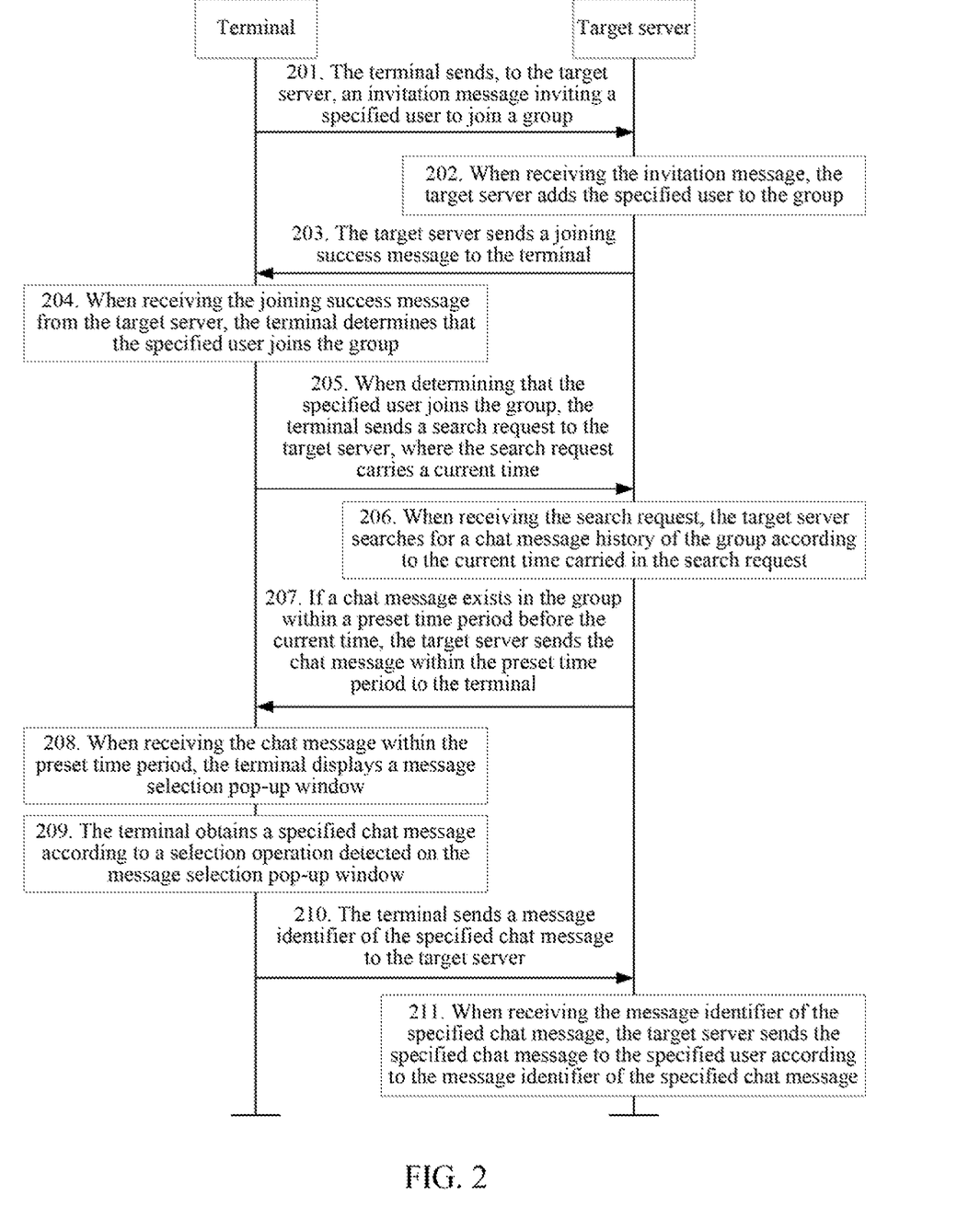
FIG. 2 is a flowchart of another method for processing a group chat message according to an embodiment of the present invention.

FIG. 2 is a flowchart of a method for processing a group chat message according to an embodiment of the present invention. The method can be applied to a terminal. Optionally, the terminal is a terminal on which a social application is running, a group exists in the social application, and a current user is further logged in to the social application by using a user account. Referring to FIG. 2, the method for processing a group chat message may include the following steps.

201: A terminal sends, to a target server, an invitation message inviting a specified user to join a group.

The invitation message may carry a user identifier of the specified user and an identifier of the group that the specified user is to join. The target server is a server providing and instant messaging service.

202: When receiving the invitation message, the target server adds the specified user to the group.

When receiving the invitation message, the target server may add the specified user to the group according to the user identifier and the group identifier that are carried in the invitation message. The joining may be to establish an association relationship between the user identifier of the specified user and the group identifier, so that the specified user can receive data (e.g., using the social application) such as a chat message, a group notice, a group mail, or a group calendar that is sent by another user in the group. In addition, the specified user is also provided with a permission to send data such as a chat message, a group notice, a group mail, or a group calendar in the group.

203: The target server sends a joining success message to the terminal.

After the specified user joins the group successfully, the joining success message is used to inform the terminal that the specified user has joined the group.

204: When receiving the joining success message from the target server, the terminal determines that the specified user joins the group.

The foregoing Steps 201 to 204 are an implementation manner of a process in which the terminal invites the specified user to join the group. The specified user may set that the specified user joins a group without verification. In this case, a terminal user may directly invite the specified user to join the group. The terminal user refers to a user using the terminal.

If the specified user sets that verification needs to be performed before the specified user joins a group, Steps 201 to 204 may be replaced with the following steps: sending, by a terminal to a target server, an invitation message inviting a specified user to join a group, so that the target server forwards the invitation message to the specified user, and when the specified user accepts the invitation and joins the group, the target server returns a joining success message, and when the joining success message from the target server is received, determining that the specified user joins the group.

205: When determining that the specified user joins the group, the terminal sends a search request to the target server, where the search request carries a current time.

The search request is used to find whether a chat message exists in the group within a preset time period before the current time. Optionally, the search request may further carry a preset time period.

Optionally, the preset time period may be set by a terminal user, and the preset time period may be preset duration, far example, any duration between 30 minutes and one hour, or may be a specified time period, for example, a time period from 13:00 to 14:00.

Figure 3A:
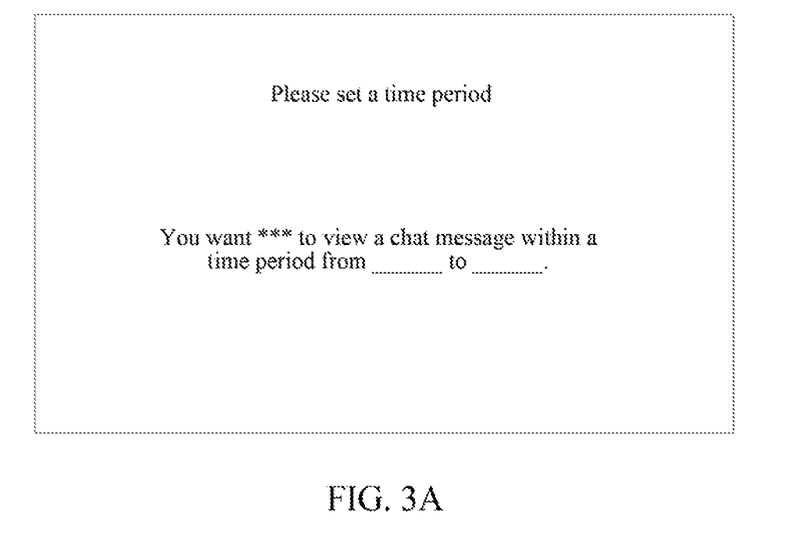
FIG. 3A is a schematic diagram of a time period setting interface according to an embodiment of the present invention.

Optionally, when a terminal user invites a user to join the current group, the terminal may provide a time period setting interface to the terminal user (e.g., inviter user). The time period setting interface may be shown in FIG. 3A, where a user account or a nickname of the specified user (invitee user) may be displayed in the area marked by asterisks. The terminal user can flexibly choose, by setting the preset time period, a part of chat messages to be presented to the specified user.

206: When receiving the search request, the target server searches for a chat message history of the group according to the current time carried in the search request.

Certainly, the preset time period may also be a time period set by default by the target server.

The chat message history of the group is stored on the target server. The target server may search for the stored chat message history of the group according to the current time and the preset time period carried in the search request. When any user in the group sends a chat message during a preset time period before the current time, the chat message within the preset time period is obtained.

Alternatively, the target server may search for the stored chat message history of the group according to the current time carried in the search request and the preset time period set by default by the target server. When any user in the group sends a chat message within the preset time period before the current time, the chat message within the preset time period is obtained.

207: If a chat message exists in the group within a preset time period before the current time, the target server sends the chat message within the preset time period to the terminal.

It should be noted that, when sending the chat message, the target server further sends a message identifier of the chat message, where the message identifier is used to uniquely identify the chat message.

The foregoing Steps 205 to 207 are a process in which the terminal and the target server interact to search for a chat message within a preset time period. Generally, the terminal may also cache a chat message history of the group. Therefore, the search process (Step 205 to Step 207) may also be replaced with the following steps: searching for a locally-cached chat message history of the group according to the current time, to obtain a search result, and if the search result includes a chat message, performing Step 208. By means of a local search, interaction between the terminal and the target server can be reduced, traffic of the terminal can be reduced, and duration of the search may also be reduced due to an interaction process is reduced.

208: When receiving the chat message within the preset time period, the terminal displays a message selection pop-up window, where the message selection pop-up window includes the chat message within the preset time period.

Specifically, if a chat message exists in the group within the preset time period before the current time, the message selection pop-up window is displayed according to a sender, message content, and a sending time of the chat message within the preset time period, where each chat message in the message selection pop-up window corresponds to one message selection box. When the message selection pop-up window is displayed, due to the limitation of the size of the pop-up window, if a quantity of chat messages within the preset time period exceeds a preset value, the chat messages may be displayed in pages, and a page switching option may be displayed in the message selection pop-up window, so that the user can turn the pages to perform selection.

Certainly, the chat messages may also be displayed in the form of a flexible box instead of pages. When the message selection pop-up window is initially displayed, the chat messages are displayed according to an original size of the pop-up window, and when a zoom operation of the user on the pop-up window is detected, the size of the pop-up window is adjusted according to a movement trajectory of the zoom operation, so that more chat messages are displayed in the adjusted pop-up window.

Figure 3B:
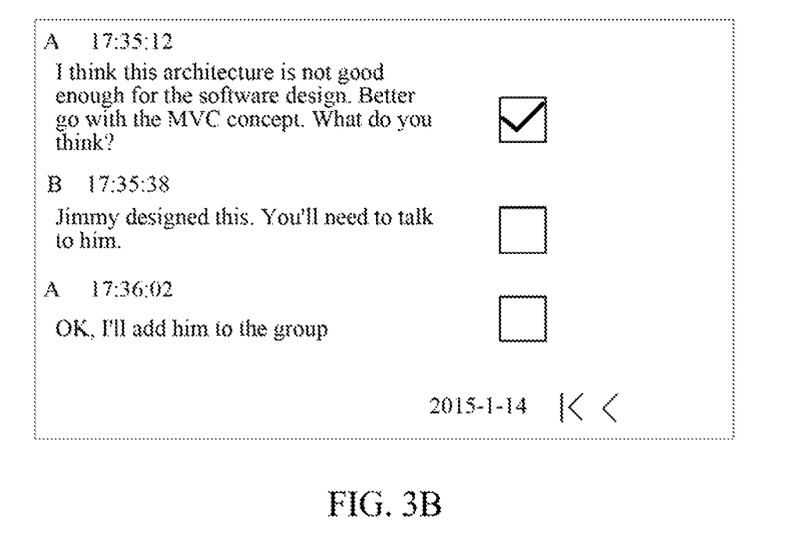
FIG. 3B is a schematic diagram of an interface of a message selection pop-up window according to an embodiment of the present invention.

As shown in FIG. 3B, FIG. 3B provides a schematic diagram of an interface of a message selection pop-up window. Each chat message in the message selection pop-up window corresponds to one message selection box, and a terminal user may select, by using a selection operation, a chat message that the user intends to provide to the specified user.

209: The terminal obtains a specified chat message according to a selection operation detected on the message selection pop-up window.

When detecting a selection operation on any chat message in the message selection pop-up window, the terminal obtains the selected specified chat message. A message selection box is provided, so that the user can choose which chat messages are relatively crucial chat messages, so as to send the chosen chat messages, thereby preventing interference from some irrelevant messages, and improving accuracy and effectiveness of obtaining a message.

210: The terminal sends a message identifier of the specified chat message to the target server.

When sending the message identifier of the specified chat message to the target server, the terminal can further send user identifiers of specified users, so that the target server learns users a chat message is to be sent to, and chat messages that are to be sent. Certainly, the terminal may further send a group identifier to the target server, so that the target server sends the specified chat message in a group chat.

211: When receiving the message identifier of the specified chat message, the target server sends the specified chat message to the specified user according to the message identifier of the specified chat message.

The targeted sending avoids interference to other users in the group.

In an actual scenario, as another possible implementation manner, to highlight a key message, the terminal may also choose to send the specified chat message in the group. In this case, the terminal may send a group identifier to the target server, so that the target server sends the specified chat message in the group according to the message identifier of the specified chat message and the group identifier.

It should be noted that, there may be one or more specified users in this embodiment of the present invention. When sending the specified chat message to the specified user, the target server may separately send the specified chat message to multiple specified users, so that all the specified users receive the specified chat message separately.

According to the method provided in this embodiment of the present invention, when a specified user joins a group, it is determined whether a chat messages exists in the group recently, so that a specified chat message is sent to the specified user according to the chat message. A very simple manner of sending a specified chat message is provided to a user, so that the user can present a previous chat message to a specified user that newly joins a group, thereby greatly improving, processing efficiency.

It should be noted that, Step 208 and Step 209 may further be alternatively implemented in another implementation manner.

In an alternative implementation manner, the terminal displays a user selection pop-up window, and the terminal determines, according to a selection operation detected on the user selection pop-up window, a chat message sent in the group by a selected user within the preset time period as the specified chat message.

In another alternative implementation manner, the terminal displays a time selection pop-up window, and the terminal determines, according to a selection operation detected on the time selection pop-up window, a chat message sent in the group within a sub-time period of the preset time period as the specified chat message.

In another alternative implementation manner, the terminal displays a message-type selection pop-up window, and the terminal determines, according to a selection operation detected on the message-type selection pop-up window, a chat message that is sent within the preset time period and is of a selected message type as the specified chat message. The message type includes, but is not limited to, a text message, a symbol message, a picture message, a voice message, and a video message.

In addition, the foregoing several selection manners may also be used in combination. For example, when a video message sent by a user needs to be sent to the specified user, "a user" and a message type "video message" need to be selected.

Further alternatively, in a relatively simple embodiment, the terminal directly determines all the chat messages within the preset time period as specified chat messages without the need of selection of the user.

Figure 4A:
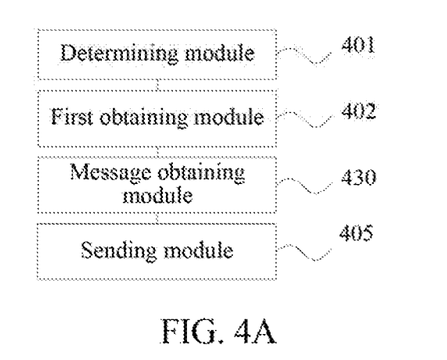
FIG. 4A is a schematic structural diagram of an apparatus for processing a group chat message according to an embodiment of the present invention.

FIG. 4A is a schematic structural diagram of an apparatus for processing a group chat message according to an embodiment of the present invention. The apparatus may be implemented as the foregoing terminal or a part of the foregoing terminal by using software, hardware, or a combination thereof. Referring to FIG. 4A, the apparatus includes (e.g., at least a processor configured to execute): a determining module 401, configured to determine that a specified user joins a group; a first obtaining module 402, configured to: if a chat message exists in the group within a preset time period before a current time, obtain the chat message within the preset time period; a message obtaining module 430, configured to determine a specified chat message of the chat message within the preset time period; and a sending module 405, configured to send a message identifier of the specified chat message to a target server, so that the target server sends the specified chat message to the specified user according to the message identifier of the specified chat message.

Optionally, the determining module 401 is configured to: send, to the target server, an invitation message inviting the specified user to join the group, so that the target server adds the specified user to the group and returns a joining success message, and when the joining success message from the target server is received, determine that the specified user joins the group; or the determining module 401 is configured to: send, to the target server, an invitation message inviting the specified user to join the group, so that the target server forwards the invitation message to the specified user, and when the specified user accepts the invitation and joins the group, the target server returns a joining success message, and when the joining success message from the target server is received, determine that the specified user joins the group.

Figure 4B:
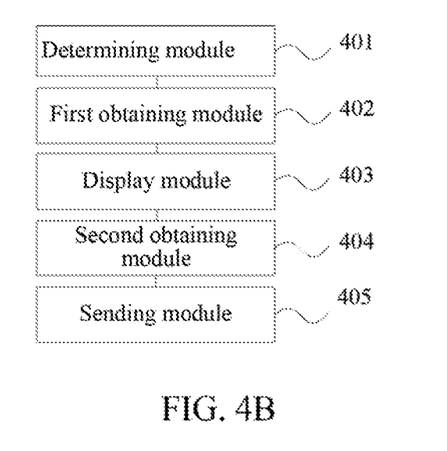
FIG. 4B is a schematic structural diagram of an apparatus for processing a group chat message according to an embodiment of the present invention.

Optionally, the message obtaining module 430 includes a display module 403 and a second obtaining module 404, as shown in FIG. 4B.

The display module 403 is configured to display a message selection pop-up window, where the message selection pop-up window includes the chat message within the preset time period.

The second obtaining module 404 is configured to obtain the specified chat message according to a selection operation detected on the message selection pop-up window.

Optionally, the sending module 405 is further configured to: send a search request to the target server, where the search request carries the current time, and the target server searches for a chat message history of the group according to the current time, and returns a search result, and if the search result includes a chat message, trigger the display module to perform the step of displaying a message selection pop-up window; or the sending module 405 is further configured to: search for a locally-cached chat message history of the group according to the current time, to obtain a search result, and if the search result includes a chat message, trigger the display module to perform the step of displaying a message selection pop-up window.

Optionally, the display module 403 is configured to: if a chat message exists in the group within the preset time period before the current time, display the message selection pop-up window according to a sender, message content, and a sending time of the chat message within the preset time period, where each chat message in the message selection pop-up window corresponds to one message selection box.

Optionally, the sending module 405 is configured to: when sending the message identifier of the specified chat message to the target server, send a group identifier to the target server, so that the target server sends the specified chat message in the group.

It should be noted that the division of the above functional modules is only described for exemplary purposes when the apparatus for processing a group chat message provided in the foregoing embodiment is processing a group chat message. In actual applications, the functions may be allocated to different functional modules according to specific needs, which means that the internal structure of the apparatus is divided into different functional modules to complete all or some of the above described functions. In addition, the apparatus for processing a group chat message provided in the foregoing embodiment is based on the same concept as the method for processing a group chat message in the foregoing embodiments. For the specific implementation process, refer to the method embodiments, and the details are not described herein again.

Figure 5:
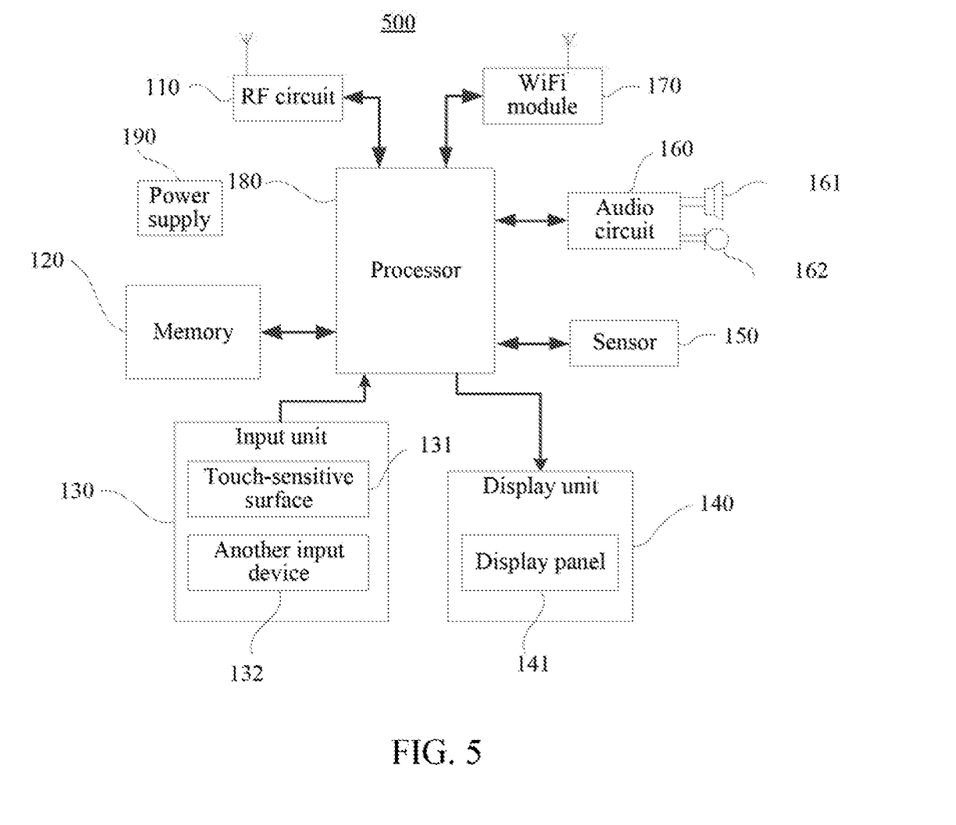
FIG. 5 is a schematic structural diagram of a terminal according to an embodiment of the present invention.

An embodiment provides a terminal, where the terminal can be configured to execute the method for processing a group chat message provided in the foregoing embodiments. Referring to FIG. 5, the terminal 500 includes:

The terminal 500 may include components such as a radio frequency (RF) circuit 110, a memory 120 including one or more computer readable storage media, an input unit 130, a display unit 140, a sensor 150, an audio circuit 160, a Wireless Fidelity (WiFi) module 170, a processor 180 including one or more processing cores, and a power supply 190. A person skilled in the art can understand that the structure of the terminal shown in FIG. 5 does not constitute a limitation to the terminal, and the terminal may include more components or fewer components than those shown in the figure, or some components may be combined, or a different component deployment may be used.

The RF circuit 110 may be configured to receive and send signals during information receiving and sending process or a call process. Particularly, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device through wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memos 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 500, and the like. In addition, the memory 120 may include a high speed random access memory, and may also include a non-volatile memory, such as at least one magnetic disk storage device, a flash memory, or another volatile solid-state storage device. Correspondingly, the memory 120 may further include a memory controller, so as to provide access of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touch screen or a touch panel, may collect a touch operation of a user or near the touch-sensitive surface 131 (such as art operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive a command sent from the processor 180 and execute the command. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided to the user, and various graphical user interfaces of the terminal 500. The graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 5, the touch-sensitive surface 131 and the display panel 141 are used as two separate parts to implement input and output functions, in some embodiments, the touch-sensitive surface 131 and the display panel 141 may be integrated to implement the input and output functions.

The terminal 500 may further include at least one sensor 150, such as an optical sensor, a motion sensor, and other sensors. Specifically, the optical sensor may include an ambient light sensor and a proximity sensor. The ambient light sensor can adjust luminance of the display panel 141 according to brightness of the ambient light. The proximity sensor may switch off the display panel 141 and/or backlight when the terminal 500 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal device 400 are not further described herein.

The audio circuit 160, a loudspeaker 161, and a microphone 162 may provide audio interfaces between the user and the terminal 500. The audio circuit 160 may convert received audio data into an electric signal and transmit the electric signal to the loudspeaker 161. The loudspeaker 161 converts the electric signal into a sound signal and outputs the sound signal. On the other hand, the microphone 162 converts a collected sound signal into an electric signal. The audio circuit 160 receives the electric signal and converts the electric signal into audio data, and outputs the audio data to the processor 180 for processing. Then the processor 180 sends the processed audio data to, for example, another terminal device by using the RF circuit 110, or outputs the audio data to the memory 120 for further processing. The audio circuit 160 may further include an earplug jack, so as to provide communication between a peripheral earphone and the terminal 500.

WiFi is a short distance wireless transmission technology. The terminal 500 may help, by using the WiFi module 170, the user to receive and send e-mails, browse a webpage, access streaming media, and so on, which provides wireless broadband Internet access to the user. Although FIG. 5 shows the WiFi module 170, it may be understood that the WiFi module 170 is not a necessary component of the terminal 500, and when required, the WiFi module 170 may be omitted as long as the scope of the essence of the present disclosure is not changed.

The processor 180 is the control center of the terminal 500, and is connected to various parts of the mobile phone by using various interfaces and lines. By running or executing the software program and/or module stored in the memory 120, and invoking data stored in the memory 120, the processor 180 performs various functions and data processing of the terminal 500, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that the foregoing modem may also not be integrated into the processor 180.

The terminal 500 further includes the power supply 190 (such as a battery) for supplying power to the components. Preferably, the power supply may be logically connected to the processor 180 by using a power management system, thereby implementing functions such as charging, discharging, and power consumption management by using the power management system. The power supply 190 may further include one or more of a direct current or alternating current power supply, a recharging system, a power failure detection circuit, a power supply converter or inverter, a power supply state indicator, and any other components.

Although not shown in the figure, the terminal 500 may further include a camera, a Bluetooth module, and the like, which are not further described herein. Specifically, in this embodiment, the display unit of the terminal is a touch screen display, and the terminal further includes a memory and one or more programs. The one or more programs are stored in the memory and configured to be executed by one or more processors. The one or more programs contain instructions used for implementing the terminal side operations (e.g., on a social application) in the example shown in FIG. 1 or FIG. 2.

Figure 6:
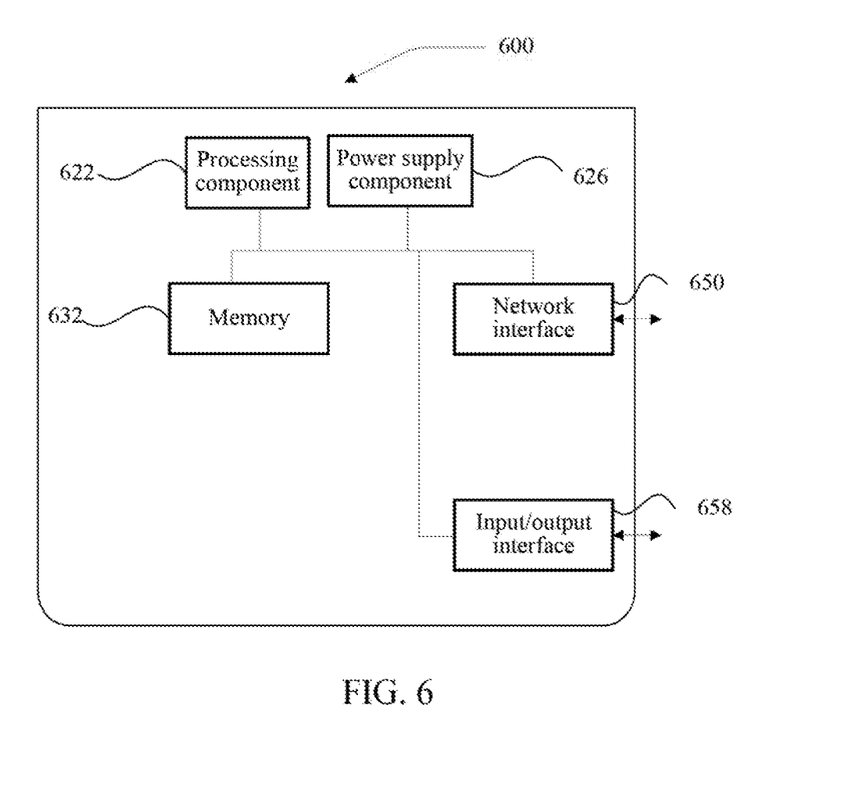
FIG. 6 is a block diagram of an apparatus for processing a group chat message according to an exemplary embodiment.

FIG. 6 is a block diagram of an apparatus 600 for processing a group chat message according to an exemplary embodiment. For example, the apparatus 600 may be provided as a server (e.g., an instant messaging server). Referring to FIG. 6, the apparatus 600 includes a processing component 622 that further includes one or more processors, and a memory resource that is represented by a memory 632 and used for storing instructions executable by the processing component 622, for example, an application program. The application program stored in the memory 632 may include one or more modules, where each module corresponds to a set of instructions. In addition, the processing component 622 is configured to execute instructions to implement the process completed by the target server side in the embodiment shown in FIG. 2.

The apparatus 600 may further include a power supply component 626 configured to implement power management of the apparatus 600, a wired or wireless network interface 650 configured to connect the apparatus 600 to a network, and an input/output (I/O) interface 658. The apparatus 600 may be operated based on an operating system, for example, Windows Server™, Mac OS X™, Unix™, Linux™, or FreeBSD™, stored in the memory 632.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A method for processing a group chat message, comprising:
    determining that a user is joined into a group;
    sending a search request to the target server, wherein the search request includes a current time, and the target server searches for a chat message history of the group according to the current time and a preset time period;
    receiving a search result from the target server;
    if at least one chat message exists in the group within the preset time period before the current time, obtaining the at least one chat message within the preset time period from the search result;
    selecting a chat message from the at least one chat message within the preset time period, comprising:
        displaying a message selection window, wherein the message selection window comprises the at least one chat message from the search result; and
        obtaining the selected chat message according to a selection operation; and
    sending the selected chat message and a group identifier of the group to the target server, wherein the selected chat message is sent by the target server to the group containing the user according to the group identifier, the selected chat message being one of the at least one chat message exists in the group within the preset time period before the current time.

2. The method according to claim 1, wherein the determining that the user is joined into a group comprises:
    sending, to a target server, an invitation message inviting the user to join the group, wherein the target server adds the user to the group and returns a joining success message, and when the joining success message from the target server is received, determining that the user is joined into the group; or
    sending, to the target server, an invitation message inviting the user to join the group, wherein the target server forwards the invitation message to the user, and when the user accepts the invitation and joins the group, the target server returns a joining success message, and when the joining success message from the target server is received, determining that the user is joined into the group.

3. The method according to claim 1, wherein the displaying a message selection window comprises:
    if the at least one chat message exists in the group within the preset time period before the current time, displaying the message selection window according to a sender, message content, and a sending time of the at least one chat message within the preset time period.

4. The method according to claim 1, wherein the message selection window comprises a page switching option for changing pages displayed on the message selection window.

5. The method according to claim 1, wherein sending the selected chat message to the target server comprises:
    sending a message identifier of the selected chat message to a target server, wherein the selected chat message is forwarded by the target server to the group containing the user according to the message identifier of the selected chat message.

6. The method according to claim 1, wherein:
    each chat message in the message selection window corresponds to one message selection box; and
    obtaining the selected chat message according to a selection operation comprises:
    checking the message selection box corresponding to the selected chat message.

7. An apparatus for processing a group chat message, comprising at least one processor configured to:
    determine that a user is joined into a group;
    send a search request to the target server, wherein the search request includes a current time, and the target server searches for a chat message history of the group according to the current time and a preset time period;
    receive a search result from the target server;
    if at least one chat message exists in the group within the preset time period before the current time, obtain the at least one chat message within the preset time period from the search result;
    select a chat message from the at least one chat message within the preset time period, comprising:
        displaying a message selection window, wherein the message selection window comprises the at least one chat message from the search result; and
        obtaining the selected chat message according to a selection operation; and
    send the selected chat message and a group identifier of the group to the target server, wherein the selected chat message is sent by the target server to the group containing the user according to the group identifier, the selected chat message being one of the at least one chat message exists in the group within the preset time period before the current time.

8. The apparatus according to claim 7, wherein the at least one processor is further configured to:
send, to a target server, an invitation message inviting the user to join the group, wherein the target server adds the user to the group and returns a joining success message, and when the joining success message from the target server is received, determine that the user is joined into the group; or
send, to the target server, an invitation message inviting the user to join the group, wherein the target server forwards the invitation message to the user, and when the user accepts the invitation and joins the group, the target server returns a joining success message, and when the joining success message from the target server is received, determine that the user is joined into the group.

9. The apparatus according to claim 7, wherein the at least one processor is further configured to:
if the at least one chat message exists in the group within the preset time period before the current time, display the message selection window according to a sender, message content, and a sending time of the at least one chat message within the preset time period.

10. A non-transitory computer-readable medium containing one or more programs for, when being executed by one or more processors, performing operations for processing a group chat message, including:
determining that a user is joined into a group;
sending a search request to the target server, wherein the search request includes a current time, and the target server searches for a chat message history of the group according to the current time and a preset time period;
receiving a search result from the target server;
if at least one chat message exists in the group within the preset time period before the user joined the group, obtaining the at least one chat message within the preset time period from the search result;
selecting a chat message from the at least one chat message within the preset time period, comprising:
displaying a message selection window, wherein the message selection window comprises the at least one chat message from the search result; and
obtaining the selected chat message according to a selection operation; and
sending the selected chat message and a group identifier of the group to the target server, wherein the selected chat message is sent by the target server to the group containing the user according to the group identifier, the selected chat message being one of the at least one chat message exists in the group within the preset time period before the current time.

11. The non-transitory computer-readable medium according to claim 10, wherein the one or more programs further comprise instructions used to perform the following operations:
sending, to a target server, an invitation message inviting the user to join the group, wherein the target server adds the user to the group and returns a joining success message, and when the joining success message from the target server is received, determining that the user is joined into the group; or
sending, to the target server, an invitation message inviting the user to join the group, wherein the target server forwards the invitation message to the user, and when the user accepts the invitation and joins the group, the target server returns a joining success message, and when the joining success message from the target server is received, determining that the user is joined into the group.

12. The non-transitory computer-readable medium according to claim 10, wherein the one or more programs further comprise instructions used to perform the following operations:
if the at least one chat message exists in the group within the preset time period before the current time, displaying the message selection window according to a sender, message content, and a sending time of the at least one chat message within the preset time period.

* * * * *